United States Patent [19]

Falk

[11] Patent Number: 4,584,143
[45] Date of Patent: Apr. 22, 1986

[54] FLUOROALKYL-CARBAMYL GROUP CONTAINING ACRYLATES AND METHACRYLATES

[75] Inventor: Robert A. Falk, New City, N.Y.

[73] Assignee: Ciba Geigy Corporation, Ardsley, N.Y.

[21] Appl. No.: 655,835

[22] Filed: Oct. 1, 1984

[51] Int. Cl.$^4$ ................ C07C 125/065; C07C 155/02
[52] U.S. Cl. .................... 558/240; 560/159; 560/160; 526/243; 526/245
[58] Field of Search ............. 560/222, 160, 159; 260/455 A

[56] References Cited

U.S. PATENT DOCUMENTS

| | | | |
|---|---|---|---|
| 2,803,656 | 8/1957 | Ahlbrecht et al. | 560/222 |
| 3,445,491 | 5/1969 | Pacini | 260/455 R |
| 4,125,671 | 11/1978 | Magazzu | 260/455 A |

FOREIGN PATENT DOCUMENTS 0040923 12/1981 European Pat. Off. .

OTHER PUBLICATIONS

Conant, James Bryant et al., *The Chemistry of Organic Compounds* 4th ed. (1952) MacMillan, Publ. at p. 335.

Primary Examiner—Natalie Trousof
Assistant Examiner—L. Hendriksen
Attorney, Agent, or Firm—Michael W. Glynn

[57] ABSTRACT

Fluoroalkyl containing acrylate and methacrylate monomer derivatives of the formula

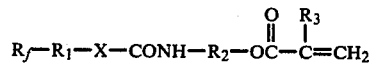

wherein
  $R_f$ is perfluoroalkyl or omega-hydroperfluoroalkyl;
  $R_1$ is -alkylene—$R_4$-alkylene)$_n$, where n is 0 to 60, $R_4$ is independently —O—, —S—, —SO$_2$—, —NR$^1$—, —SO$_2$NR$^1$— or —CONR$^1$— where $R^1$ is hydrogen or alkyl of up to 6 carbon atoms and each "alkylene" contains up to 12 carbon atoms and is unsubstituted or substituted by hydroxy or halo;
  X is —O—, —S— or —NR"— wherein R" is hydrogen or lower alkyl;
  $R_2$ is alkylene of up to 12 carbon atoms; and
  $R_3$ is hydrogen or methyl, their preparation and their use in the preparation of hydrophobic and oleophobic finishes are disclosed.

4 Claims, No Drawings

FLUOROALKYL-CARBAMYL GROUP CONTAINING ACRYLATES AND METHACRYLATES

BACKGROUND OF THE INVENTION

The instant invention relates to new and useful perfluoroalkyl-carbamyl group containing acrylate and methacrylate monomers, polymers thereof, and their use in rendering cellulosic, natural, and synthetic polyamide materials hydrophobic and oleophobic.

It is a further object of this invention to provide a simple economic method of preparing such acrylate and methacrylate monomers.

Various structurally divergent perfluoroalkyl acrylate and methacrylate monomers are known as described in U.S. Pat. Nos. 2,642,416, 3,102,103, 3,282,905, 3,544,663, 3,655,732, and 4,060,681. However, their structure is substantially different from those of the instant invention, and such prior-art preparations invariably entail cumbersome multistep techniques with consequent losses of the costly fluorochemical.

DETAILED DESCRIPTION OF THE INVENTION

The Fluoroalkyl-containing acrylate and methacrylate monomer derivatives of the instant invention are represented by the formula

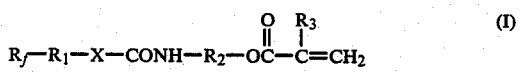

wherein $R_f$ is perfluoroalkyl or omega-hydroperfluoroalkyl; $R_1$ is -alkylene—$(R_4$-alkylene$)_n$ where n is 0 to 60, $R_4$ is independently —O—, —S—, —SO$_2$—, —NR$^1$—, —SO$_2$NR$^1$— or —CONR$^1$— where $R^1$ is hydrogen or alkyl of up to 6 carbon atoms and each "alkylene" contains up to 12 carbon atoms and is unsubstituted or substituted by hydroxy or halo; X is —O—, —S— or —NR″—, where R″ is hydrogen or alkyl of up to 6 carbon atoms; $R_2$ is alkylene of up to 12 carbon atoms; and $R_3$ is hydrogen or methyl.

The $R_f$ group generally contains from 1 to 18 carbon atoms, preferably from 3 to 12 carbon atoms and most preferably from 6 to 12 carbon atoms. The $R_f$ group may be straight or branched chain. Preferred are those $R_f$ groups which are perfluoroalkyl and especially advantageous are those wherein the perfluoroalkyl is a mixture thereof.

In one embodiment of the invention, $R_1$ is alkylene of 1 to 12 carbon atoms, and n is 0. In this embodiment, $R_1$ is preferably 2 to 6 carbon atoms which is unsubstituted or monosubstituted by hydroxy, chloro, bromo or iodo. Most preferably, $R_1$ is ethylene.

In an alternate embodiment, $R_1$ is alkylene of 1 to 12 carbon atoms, and n is 1 to 60. In this embodiment, $R_1$ is preferably alkylene of 2 to 3 carbon atoms, $R_4$ is preferably —O— or —S— and each alkylene unit is independently unsubstituted or monosubstituted by hydroxy, chloro, bromo or fluoro. Where alkylene is monosubstituted, especially advantageous are those alternate embodiments where n is 1. X is preferably —O—, —S— or —NR″— where R″ is hydrogen or methyl and more preferably X is —O— or —S—. Most preferred are those compounds wherein X is —S—.

$R_2$ is preferably alkylene of 2 to 6 carbon atoms, more preferably straight chain alkylene of 2 to 6 carbon atoms, and most preferably is ethylene.

$R_3$ is hydrogen or methyl, and more preferably $R_3$ is methyl.

The compounds of formula I are advantageously prepared by reacting a compound of the formula:

wherein $R_f$, $R_1$ and X are as defined above; with a difunctional monomer having a reactive isocyanate group and a polymerizable vinyl double bond of the formula:

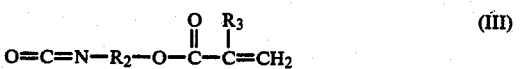

where $R_2$ and $R_3$ are defined above, at a temperature between $-20°$ C. and $100°$ C., preferably $10°$ C. to $50°$ C., optionally in the presence of an inert solvent, such as petroleum ether, 1,1,2-trichloro-trifluoroethane, methyl ethyl ketone, toluene, 2-ethoxyethyl acetate, hexafluoro-xylene, and the like. Advantageously, this process can be conducted in the presence or absence of a conventional urethane catalyst, such as dibutyltin dilaurate an/or a tertiary amine including tri-alkylamines, di-alkyl aralkylamines, di-alkyl arylamines, N-alkyl heteroamines, aromatic heterocyclic amines, and the like, such as triethylamine, N,N-dimethyl benzylamine, N,N-dimethyl aniline, N-methyl piperidine, or pyridine. Since the reaction proceeds by addition, no coproducts are formed to any appreciable extent, thereby simplifying purification and isolation. In many cases, the reaction product may be used without any purification of the desired product. Alternatively, the vinyl monomer may be purified by conventional crystallization procedures and obtained by filtration and evaporation.

The starting materials of formulae II and III are known in the art.

For example, the monomers of formula III are described in U.S. Pat. Nos. 2,718,516 and 2,821,544 and are described in J. Coatings Technology, Vol. 55, (703), pp. 55–61 (1983). Preferred monomers of formula III are those wherein $R_2$ is alkylene of 2 to 6 carbon atoms and $R_3$ is hydrogen or methyl, and include isocyanatoethyl acrylate, isocyanatoethyl methacrylate, isocyanatobutyl acrylate, isocyanatobutyl methacrylate, isocyanatohexyl acrylate, and isocyanatohexyl methacrylate. Isocyanatoethyl methacrylate is a preferred monomer from the standpoint of ease of copolymerization and availability.

Typical thiols of formula II are $R_f$—$R_1$—SH wherein $R_f$ and $R_1$ are previously described.

Such perfluoroalkyl thiols are well documented in the prior art. For example, thiols of the formula $R_fR_1$—SH have been described in a number of U.S. patents including U.S. Pat. Nos. 2,894,991; 2,961,470; 2,965,677; 3,088,849; 3,172,190; 3,544,663 and 3,655,732.

Thus, U.S. Pat. No. 3,655,732 discloses mercaptans of formula $R_f$—$R_1$—SH where $R_1$ is alkylene of 1 to 16 carbon atoms and $R_f$ is perfluoroalkyl and teaches that halides of formula $R_f$—$R_1$—halogen are well-known; reaction of $R_fI$ with ethylene under free-radical conditions give $R_f(CH_2CH_2)_aI$ while reaction of $R_fCH_2I$ with ethylene gives $R_fCH_2(CH_2CH_2)_aI$ as is further taught in U.S. Pat. Nos. 3,088,849; 3,145,222; 2,965,659 and 2,972,638.

U.S. Pat. No. 3,655,732 further discloses compounds of formula $R_f$—$R_1$—X—$R_1$—SH where the $R_1$'s are independently alkylene of 1 to 16 carbon atoms; $R_f$ is perfluoroalkyl of 4 through 14 carbon atoms and X is —S— or —$NR_4$— where $R_4$ is hydrogen or alkyl of 1 through 4 carbon atoms.

U.S. Pat. No. 3,544,663 teaches that the mercaptan $R_fCH_2CH_2SH$ where $R_f$ is perfluoroalkyl of 5 to 13 carbon atoms, can be prepared by reacting the perfluoroalkyl alkylene iodide with thiourea or by adding $H_2S$ to a perfluoroalkyl substituted ethylene ($R_f$—CH=$CH_2$), which in turn can be prepared by dehydrohalogenation of the halide $R_f$—$CH_2$C-$H_2$—halogen.

The reaction of the iodide Rf—$R_1$—I with thiourea followed by hydrolysis to obtain the mercaptan $R_f$—$R_1$—SH is the preferred synthetic route and the reaction is applicable to both linear and branched chain iodides.

Particularly preferred herein are the thiols of formula $R_fCH_2CH_2SH$ where $R_f$ is perfluoroalkyl of 6 to 12 carbon atoms. These $R_f$-thiols can be prepared from $R_fCH_2CH_2I$ and thiourea in very high yield.

Typical thiols which are included within the context of this invention are:
$CF_3CF_2CH_2SH$
$C_{12}F_{25}CH_2CH_2SH$
$C_8F_{17}CH_2CH_2OCH_2CH_2CH_2SH$
$C_6F_{13}CH_2CH_2N(CH_3)CH_2CH_2CH_2SH$
$C_8F_{17}CH_2CH_2SCH_2CH_2CH_2SH$
$C_8F_{17}CH_2CH_2SO_2NHCH_2CH_2CH_2SH$ Typical alcohols of formula II are $R_f$—$R_1$—OH wherein $R_f$ and $R_1$ are previously described.

The preparation of perfluoroalkyl alcohols of formula II useful for purposes of this invention are taught in U.S. Pat. Nos. 3,655,732, 3,282,905, 2,642,416, 3,102,103, 4,302,366, 4,266,080, and 4,310,698.

Typical alcohols which are included within the context of this invention include:
$C_8F_{17}CH_2CH_2OH$
$C_8F_{17}CH_2CH_2SCH_2CH_2OH$
$C_6F_{13}CH_2CH_2CH_2OCH_2CH_2OH$
$C_{10}F_{21}CH_2OH$
$C_8F_{17}CH_2CH_2S(CH_2)_{11}OH$
$C_8F_{17}CH_2CH_2SO_2N(C_2H_5)CH_2CH_2OH$
$C_6F_{13}CH_2CH_2N(CH_3)CH_2CH_2OH$
$C_8F_{17}CH_2CH_2SO_2CH_2CH_2OH$ $$C_8F_{17}CH_2CH_2SCH_2\underset{\underset{OH}{|}}{CH}CHO(\underset{\underset{CH_3}{|}}{CH}CHO)_{50}H$$

Typical amines of formula II are $R_f$—$R_1$—NHR″ wherein $R_f$, $R_1$ and R″ are as previously described.

The preparation of perfluoroalkyl amines of formula II useful for purposes of this invention are taught in U.S. Pat. Nos. 3,369,064, 3,663,604, 3,808,251, 3,838,165, 4,059,629; German DE Nos. 1,961,552, 2,357,780, 2,504,514 and Japan No. 57/190008.

Typical amines included within the present context are:
$C_8F_{17}CH_2CH_2NH_2$
$C_6F_{13}CH_2CH_2SCH_2CH_2NH_2$ $$C_8F_{17}CH_2\underset{\underset{OH}{|}}{CH}-CH_2NH_2$$

$C_8F_{17}CH_2CH_2NHCH_3$ $$C_6F_{13}\underset{\underset{OH}{|}}{CH}CH_2\underset{\underset{H}{|}}{N}-iPr$$

$C_8F_{17}CH_2NH_2$

The instant α,β-unsaturated ester monomers of formula (I) are very reactive and have a strong tendency to form homo- or copolymers.

The polymerization of the $R_f$-acrylate and $R_f$-methacrylate monomers is analogous to the polymerization of such monomers as described in Houben-Weyl, *Methoden der Organichen Chemie*, Vol. 14/1, p 1044–1047, (Georg Thieme Verlag, Stuttgart, 1961) or C. E. Schildknecht, *Vinyl and Related Polymers*, p. 179-255 (John Wiley and Sons Inc, New York 1952).

Generally polymerization may be carried out in bulk, solution, suspension or emulsion. Solution and emulsion polymerization are preferred.

In emulsion polymerization, the monomer or monomers to be polymerized are emulsified together in a water solution of a surface active agent to a given monomer concentration of from about 5% to about 50%. Usually the temperature is raised to between 40° C. and 70° C. to effect polymerization in the presence of an added catalyst. A suitable catalyst may be of any one of the commonly known agents for initiating the polymerization of an ethylenically unsaturated compound. The concentration of the catalyst for the polymerization is usually between 0.1% and 2% based upon the weight of the monomers.

Suitable surfactants or emulsifying agents include cationic, anionic or non-ionic types. Since the cationic and non-ionic types can be used in most textile treating baths, they are preferred. The hydrophobic portion of the surfactant may be hydrocarbon or fluorinated hydrocarbon.

Suitable surfactants or emulsifying agents include, for example, non-ionic surfactants in which the hydrophilic groups is poly(ethoxy) group and the hydrophobic portion is either a hydrocarbon or a fluorocarbon group such as the ethylene oxide condensates of alkyl phenols, alkanols, alkylamines, alkyl thiols, alkylcarboxylic acids, fluoroalkyl carboxylic acids, fluoroalkyl amines and the like.

Suitable cationic surfactants include for example, quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the fluorinated monomer. The optimum reaction time will depend upon the catalyst used and the polymerization temperature and other conditions, but will generally be in the range of from 0.5 to 24 hours.

The polymerization temperature will depend upon the catalyst chosen. In the case of emulsion polymerization in aqueous media, it will generally be in the range of from 20° to 90° C. The polymerization is generally most conveniently and preferably carried out at atmospheric pressure wherever possible.

In solution polymerization, the monomer or monomers are dissolved in a suitable solvent such as fluorinated solvents, for example hexafluoroxylene, trifluorotoluene or mixtures thereof with acetone and/or ethylacetate and polymerized in a reaction vessel using initiators such as azobisisobutyronitrile or other azo initiators at concentrations of 0.1 to 2.0% at 40°–100° C. under nitrogen.

The monomers of formula I may be homopolymerized or co-polymerized with conventional monomers. The conventional monomers may be hydrophilic or hydrophobic or mixtures thereof. In order to impart soil release properties on textile materials, hydrophilic comonomers are advantageously employed. Where both hydrophobic and oleophobic properties are desired, the conventional comonomers are advantageously primarily hydrophobic in character for optimum results. While the amount of the monomer of formula I used in copolymerization with the conventinal comonomers can vary widely, depending upon the amount of oleophobicity, and optionally hydrophobicity, desired in the final polymeric finish, advantageously at least about 0.1 weight percent up to about 99.9 weight percent of a monomer of formula I, or mixture thereof, is used per unit weight of conventional comonomers-monomer of formula I blend.

Comonomers useful in the preparation of copolymers of the novel $R_f$ monomers include, without limitation:

Ethylene, and chloro- fluoro-amido and cyano- derivatives of ethylene such as vinyl chloride, vinylidene chloride, vinyl fluoride, acrylonitrile, methacrylonitrile acrylamide, methacrylamide and N,N-dimethylacrylamide, tetrafluoroethylene, hexafluoropropylene. Acrylate and methacrylate monomers, particularly those with 1 to 18 carbon atoms in the ester groups such as n-propyl methacrylate, 2-methyl cyclohexyl methacrylate, methyl methacrylate, t-butyl methacrylate, n-butyl methacrylate, methyl acrylate, ethyl acrylate, propyl acrylate, butyl acrylate, 3-methylpentyl acrylate, octyl acrylate, tetradecyl acrylate, s-butyl acrylate, 2-ethylhexylacrylate, 2-methoxyethyl acrylate, and phenyl acrylate; dienes particularly 1,3-butadiene, isoprene, and chloroprene, 2-fluoro-butadiene, 1,1,3-trifluorobutadiene, 1,1,2,3-tetrafluoro butadiene, 1,1,2-trifluoro-3,4-dichlorobutadiene and tri- and pentafluoro butadiene and isoprene; nitrogen vinyl monomers such as vinyl pyridine, N-vinylamides, vinyl succinimide, vinyl pyrrolidone, N-vinyl carbazole and the like, styrene and related monomers which copolymerize readily with the novel esters of this invention such as o-methylstyrene, p-methylstyrene, 3,4-dimethyl styrene, m-ethyl styrene, 2,5-diethyl styrene; vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinyl caprylate, vinyl pelargonate, vinyl myristate, vinyl oleate and vinyl linoleate; vinyl esters of aromatic acids, such as vinyl benzoate.

Propylene, butylene and isobutylene are preferred α-olefins useful as comonomers with the novel fluoro monomers of the present invention with straight and branched chain α-olefins useful with up to 10 carbon atoms in the side chain.

Also useful as comonomers with some of the novel monomers of the present invention are vinyl monomers which contain perfluorinated side chains. Examples of such perfluorinated monomers are vinyl esters containing fluoroated alkyl groups disclosed in U.S. Pat. Nos. 2,592,069 and 2,436,144. Other useful monomers are acrylates and methacrylates and derivatives thereof such as those disclosed in U.S. Pat. Nos. 2,628,958; 3,256,230; 2,839,513, 3,282,905; 3,252,932; and 3,304,278.

As mentioned, it may also be desirable to include a minor amount of other reactive comonomers e.g. in order to improve the wash and dry-clean properties of the novel textile finishes obtained according to the practice of this invention. Such monomers act as cross-linking agents during the curing operation and are generally employed in amounts of 0.01% to 5%, preferably 0.1% to 2% by weight, based on the weight of the comonomers.

Reactive monomers which may be included are by way of illustration: acrylic acid, methacrylic acid, acrylamide, methacrylamide, N-methylolacrylamide, 2-hydroxyethyl methacrylate or acrylate, hydroxypropyl acrylate of methacrylate, and t-butylaminoethyl methacrylate, and glycidyl methacrylate. Of the foregoing, N-methylolacrylamide and 2-hydroxyethyl methacrylate are preferred.

Coatings of the homopolymers and copolymers according to the instant invention can be prepared and applied from solvent solutions or from aqueous emulsions. Suitable solvents are fluoroalkanes, fluorochloroalkanes, fluoroalkyl substituted aromatics, alkyl esters of perfluoroalkanoic acids, chlorinated alkanes or aromatics, hydrocarbon aromatics, ketones, ketones, esters and ethers. Especially useful as solvents are the fluorinated liquids, and especially α,α,α-trifluorotoluene, otherwise known as benzotrifluoride, hexafluoroxylene and mixtures of these with ethyl acetate or acetone and the like. Concentrations of the fluoriated polymers of the instant invention in solvent to provide coatings with effective oil and water repellency properties will generally be of the order of 0.01 to 10% and preferably from 0.1 to 2.0% by weight. Blends of the emulsions of the polymers of this invention with blended emulsions of other polymers and copolymers are particularly useful in textile finishes. The polymer and copolymers are generally of a non-fluorinated type; however, as indicated below other fluorinated polymers and copolymers may be used if desired. Nonfluorinated polymers useful in such blends, include for example, but without limitation, polymers and copolymers of alkyl acrylates and alkyl methacrylates, such as methyl methacrylate, ethyl methacrylate, hexyl methacrylate, and n-octyl methacrylate. A particularly suitable polymer is poly-n-octyl methacrylate. Also, useful are polymers and copolymers of acrylic acid, methacrylic acid, styrene, alkyl styrene, butadiene, 2-methyl-1,3-butadiene, 2-chloro-1,3-butadiene, polymers and copolymers of vinyl esters such as vinyl acetate, vinyl butyrate, vinyl laurate, vinyl stearate, vinyl 2-ethyl-hexanoate; polymers and copolymers of vinyl halides and vinyldene halides, such as vinyl chloride, vinylidene chloride, vinyl fluoride, vinylidene fluoride, polymers and copolymers of allyl esters such as allyl propionate. or allyl caprylate, polymers and copolymers of vinyl ketones, such as methyl vinyl ether, cetyl vinyl ether, and the like; polymers and copolymers of acrylamide, methacrylamide, N-methylol acrylamide, N-methylol methacrylamide, N-isopropyl acrylamide, and methacrylonitrile.

The polymers of this disclosure possess desirable soil repellency properties. A useful manner of measuring the relative ratings of the polymers is by oil and water repellency ratings. In the examples the following test procedures were used:

The AATCC oil rating was determined according to Standard Test Method 118-1966 T of the American Association of Textile Chemists and Colorists. Ratings are given from 0 (minimum) to 8 (maximum). A commonly accepted level on soil repellent fabrics in the U.S. is an oil repellency of 4.

Another oil repellency method is the 3-M Oil Test procedure of Grajek and Peterson, *Textile Research Journal*, April 1962, p. 323.

The AATCC water spray test rating was determined according to Standard Test Method 22-1966 of the American Association of Textile Chemists and Colorists XXVII, 1961, P. 1952 (also designated ASTM-D-583-58). Ratings are given from 0 (minimum) to 100 (maximum).

The polymers in the examples were applied to polyester-cotton (65%/35%). to yield a concentration of 0.08 to 0.12% fluorine based on the weight of the fabric.

EXAMPLE 1

2-[1,1,2,2-Tetrahydroperfluoro-octylthiocarbonyl-]aminoethyl methacrylate

1,1,2,2-Tetrahydroperfluoro-octanethiol (38.4 g, 0.1 mol) and 2-isocyanatoethylmethacrylate (15.5 g, 0.1 mol) were reacted under nitrogen in 1,1,2-trichlorotrifluoroethane (150 ml) at 0°–5° C. overnight in the presence of a catalytic amount of triethylamine and dibutyltin dilaurate. The solvent was evaporated and the residual product recrystallized from n-hexane to yield 44.1 g (82.4% of theory) as a white, crystalline solid with a melting point of 55° C. NMR showed proton resonances at δ 1.96, 3 protons C(C$\underline{H_3}$)CH$_2$; δ 2.08–2.89 2 protons C$_6$F$_{13}$C$\underline{H_2}$CH$_2$; δ 3.14, 2 protons C$_6$F$_{13}$CH$_2$C$\underline{H_2}$; δ 3.64, 2 protons NHC$\underline{H_2}$CH$_2$O; δ 4.27, 2 protons $\overline{\text{NH}}$CH$_2$C$\underline{H_2}$O; δ 5.58 1 proton and δ 6.08 1 proton C(CH$_3$)C$\underline{H_2}$.

Analysis for C$_{15}$H$_{14}$F$_{13}$NO$_3$S: Calc.: C, 33.6; H, 2.6; N, 2.6; F. 46.1. Found: C, 33.6; H, 2.7; N, 2.8; F, 45.7.

EXAMPLE 2

2-[1,1,2,2-Tetrahydroperfluorodecylthiocarbonyl-]aminoethyl methacrylate

1,1,2,2-Tetrahydroperfluorodecanethiol (50.5 g, 0.105 mol) and 2-isocyanatoethylmethacrylate (15.5 g, 0.1 mol) were reacted under nitrogen in 1,1,2-trichlorotrifluoroethane (150 ml) at 0°–5° C. overnight in the presence of a catalytic amount of triethylamine and dibutyltin dilaurate. The crystallized product was filtered and washed to yield 26.3 g (41.4% of theory) as a white, crystalline solid with a melting point of 66° C. NMR showed proton resonances at δ 1.89, 3 protons C(C$\underline{H_3}$)CH$_2$; δ 1.89–2.89 2 protons C$_8$F$_{17}$C$\underline{H_2}$CH$_2$; δ 3.08, 2 protons ˙C$_8$F$_{17}$CH$_2$C$\underline{H_2}$; δ 3.64, 2 protons NHC$\underline{H_2}$CH$_2$; δ 4.27, 2 protons $\overline{\text{NH}}$CH$_2$C$\underline{H_2}$; δ 5.64, 1 proton and δ 6.14, 1 proton C(CH$_3$)C$\underline{H_2}$.

Analysis for C$_{17}$H$_{14}$F$_{17}$NO$_3$S: Calc.: C,32.1; H, 2.2; N, 2.2; F, 50.8. Found: C,32.3; H, 2.3; N, 2.4; F, 50.6.

EXAMPLE 3

2-[1,1,2,2-Tetrahydroperfluoro-octyloxycarbonyl-]aminoethyl methacrylate

1,1,2,2-Tetrahydroperfluoro-octanol (36.4 g. 0.1 mol) and 2-isocyanatoethylmethacrylate (15.5 g, 0.1 mol) were reacted under nitrogen in 1,1,2-trichlorotrifluoroethane (150 ml) at 0°–5° C. overnight in the presence of a catalytic amount of triethylamine and dibutyltin dilaurate. The solvent was evaporated and the residual oil dried under vacuum. The product crystallized and was washed with n-heptane to yield 34.1 g (65.7% of theory) as a white, crystalline solid with a melting point of 37°–38° C.

NMR showed proton resonances a δ1.83, 3 protons C(C$\underline{H_3}$)CH$_2$; δ 1.8–2.8, 2 protons C$_6$F$_{13\text{CH}2}$CH$_2$; δ 3.39, 2 protons C$_6$F$_{13}$CH$_2$C$\underline{H_2}$; δ 4.2$\overline{1}$ 4 protons NHC$\underline{H_2}$CH$_2$O; δ 5.46, 2 protons CONH and C($\overline{\text{CH}_3}$)C$\underline{H_2}$ and δ 6.02 1 proton C(CH$_3$)C$\underline{H_2}$.

Analysis for C$_{15}$H$_{14}$F$_{13}$NO$_4$: Calc.: C, 34.68; H, 2.7; N, 2.7; F, 47.6. Found: C, 37.7; H, 2.8; N, 2.9; F, 47.4.

EXAMPLE 4

2-[1,1,2,2-Tetrahydroperfluorodecyloxycarbonyl-]aminoethyl methacrylate

1,1,2,2-Tetrahydroperfluorodecanol (23.2 g, 0.05 mol) and 2-isocyanatoethylmethacrylate (7.75 g, 0.05 mol) were reacted under nitrogen in 1,1,2-trichlorotrifluoroethane (100 ml) at 0°–5° C. overnight in presence of a catalytic amount of triethylamine and dibutyltin dilaurate. The solvent was evaporated and the residual product recrystallized from n-hexane to yield 27.7 g (89.5% of theory) as a white crystalline solid with a melting point of 64°–65° C. NMR showed proton resonances at δ1.89, 3 protons C(C$\underline{H_3}$)CH$_2$; δ 2.2–2.96, 2 protons C$_6$F$_{13\text{H}2}$CH$_2$; δ 3.46, 2 protons C$_6$F$_{13}$CH$_2$C$\underline{H_2}$; δ $\overline{4.27}$, 4 protons NHC$\underline{H_2}$CH$_2$O; δ 5.14, 1 proton $\overline{\text{NH}}$; δ 5.52 1 proton and $\overline{δ}$ 6.08 1 proton C(CH$_3$)C$\underline{H_2}$.

Anaysis for C$_{17}$H$_{14}$F$_{17}$NO$_4$: Calc: C, 33.0; H, 2.3; N, 2.3; F, 52.2. Found: C, 33.2; H, 2.4; N, 2.3; F, 52.1.

EXAMPLE 5

2-[1,1,2,2-Tetrahydroperfluorododecylthiocarbonyl-]aminoethylmethacrylate

1,1,2,2-Tetrahydroperfluorododecanethiol (58.0 g, 0.1 mol) and 2-isocyanatoethyl methacrylate (16.27 g, 0.105 mol) were reacted under nitrogen in 1,1,2-trichlorotrifluoroethane (150 ml) at 40° for 30 minutes in the presence of a catalytic amount of triethylamine (1 ml). The solvent was evaporated and the residual product suspended in hexane, filtered, washed and dried to yield 71 g (95.5% of theory) of a white, crystalline solid with a melting point of 81°–82°. NMR showed proton resonances at δ 1.95, 3 protons C(C$\underline{H_3}$)CH$_2$; δ 2.14–2.77, 2 protons C$_{10}$F$_{21}$C$\underline{H_2}$CH$_2$; $\overline{δ}$ 3.14, 2 protons C$_{10}$F$_{21}$CH$_2$C$\underline{H_2}$: δ 3.6, 2 protons NHC$\underline{H_2}$CH$_2$O; δ 4.25, 2 protons $\overline{\text{NH}}$CH$_2$C$\underline{H_2}$O; δ 5.58, 1 proton and δ 6.12 proton CCH$_3$C$\underline{H_2}$; $\overline{δ}$ 5.84, 1 proton NH.

Analysis for C$_{19}$H$_{14}$F$_{21}$NO$_3$S: Calc.: C, 31.0; H, 1.9; F, 54.2.

Found: C, 31.2; H, 1.9; F, 53.9.

EXAMPLE 6

2-[1,1,2,2-Tetrahydroperfluoroalkylthiocarbonyl-]aminoethylmethacrylate

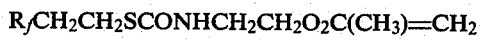
$R_fCH_2CH_2SCONHCH_2CH_2O_2C(CH_3)=CH_2$ 1,1,2,2-Tetrahydroperfluoroalkanethiol (distribution represents a mixture of 4.1% $C_8$, 69.3% $C_{10}$, 20.7% $C_{12}$, 3.8% $C_{14}$, 0.5% $C_{16}$ (60.93 g, 0.1 mol) and 2-isocyanatoethylmethacrylate (15.81 g, 0.102 mol) were reacted under nitrogen in heptane (300 g) at 60° for 30 minutes in the presence of a catalytic amount of triethylamine (1 ml). The suspension was chilled to 0°–5°, filtered, washed and dried to yield 72.8 g (95.3% of theory) of a white crystalline solid with a melting point of 78°–80°. NMR showed proton resonances in accord with theory.

Elemental Analysis: Calc'd F: 54.2. Found F: 54.4.

EXAMPLE 7

2-[2,2,2-Trifluoroethoxycarbonyl]aminoethyl methacrylate $CF_3CH_2OCONHCH_2CH_2O_2CC(CH_3)=CH_2$ 2,2,2-Trifluoroethanol (10 g, 0.1 mol) and 2-isocyanatoethylmethacrylate (15.5 g, 0.1 mol) were reacted under nitrogen in 1,1,2-trichlorotrifluoroethane (100 ml) at 0°–5° C. overnight in presence of a catalytic amount of triethylamine and dibutyltin dilaurate. The solvent was evaporated and the residual product dried in vacuum to yield 25 g (98% of theory) as a colorless oil. NMR showed proton resonances at δ 1.89, 3 protons C($\underline{CH_3}$)CH$_2$; δ 3.52, 2 protons NH$\underline{CH_2}$O; δ 4.08, 2 protons $\overline{NHCH_2CH_2O}$; δ 4.46, 2 protons CF$_3\underline{CH_2}$O; δ 5.33, 1 proton $\overline{NH}$; δ 5.58, 1 proton and δ 6.08, 1 proton C(CH$_3$)$\underline{CH_2}$.

Analysis for $C_9H_{12}F_3NO_4$: Calc.: C, 42.4; H, 4.7; N, 5.5; F 22.3. Found: C, 42.5; H, 4.5; N, 5.5; F 22.1.

EXAMPLE 8

2-[1,1,2,2-Tetrahydroperfluoroalkyloxycarbonyl-]aminoethyl methacrylate

$R_fCH_2CH_2OCONHCH_2CH_2O_2CC(CH_3)=CH_2$ 1,1,2,2-Tetrahydroperfluoroalkanol (distribution represents a mixture of 4.2% $C_4$, 32.5% $C_6$, 31.0% $C_8$, 18.7% $C_{10}$, 9.2% $C_{12}$, 4.3% $C_{14}$) 48 g, 0.1 mol and 2-isocyanatoethylmethacrylate (15.5 g, 0.1 mol) were reacted under nitrogen in 1,1,2-trichlorotrifluoroethane (200 ml) at 0°–5° C. overnight in presence of a catalytic amount of triethylamine and dibutyltin dilaurate. The solvent was evaporated and the residual product dried under vacuum to yield 60.3 g (95% of theory) as a yellow semi-solid. NMR showed proton resonances at δ 1.89, 3 protons C($\underline{CH_3}$)CH$_2$; δ 2.0–2.89, 2 protons R$_f\underline{CH_2}$CH$_2$O, δ3.52, 2 protons NH$\underline{CH_2}$CH$_2$O; δ 4.33, 4 protons R$_f$CH$_2\underline{CH_2}$O and NHCH$_2\underline{CH_2}$O, δ 5.08, 1 proton NH; δ 5.58, 1 proton and δ 6.08, 1 proton C(CH$_3$)$\underline{CH_2}$.

EXAMPLE 9

2-[1,1,9-Trihydroperfluorononyloxycarbonyl]aminoethyl methacrylate

$HCF_2(CF_2)_7CH_2OCONHCH_2CH_2O_2CC(CH_3)=CH_2$ 1,1,9-Trihydroperfluoroonanol (21.6 g, 0.05 mol) and 2-isocyanatoethylethacrylate (7.75 g, 0.05 mol) were reacted under nitrogen in 1,1,2-trichlorotrifluoroethane (150 ml) at 0°–5° C. overnight in presence of a catalytic amount of triethylamine and dibutyltin dilaurate. The solvent was evaporated and the residual oil dried under vacuum. The product was crystallized and washed with n-heptane to yield 25.5 g (86.9% of theory) as a white crystalline solid with a melting point of 41°–44° C. NMR showed proton resonances at δ 1.88, 3 protons C($\underline{CH_3}$)CH$_2$; δ 3.5, 2 protons NH$\underline{CH_2}$CH$_2$O; δ 4.25, 2 protons NHCH$_2\underline{CH_2}$O; δ 4.63, 2 protons (CF$_2$)$_7\underline{CH_2}$O; δ 5.56, 1 proton from C(CH$_3$)$\underline{CH_2}$ and 1 proton $\overline{NH}$; δ 6.06, 1 proton C(CH$_3$)$\underline{CH_2}$; δ 6.07, 1 proton $\underline{HCF_2}$(CF$_2$)$_7$.

Analysis for $C_{16}H_{13}F_{16}NO_4$: Calc.: C, 32.7; H, 2.2; N, 2.4; F, 51.7. Found: C, 33.0; H, 1.9; N, 2.3; F, 51.3.

EXAMPLE 10

Polymer of 2-[1,1,2,2-Tetrahydroperfluoro-octylthiocarbonyl-]aminoethyl methacrylate 2-[1,1,2,2-Tetrahydroperfluoro-octylthiocarbonyl-]aminoethyl methacrylate (5.0 g), azobis-isobutyronitrile (0.006 g) and 10 ml carbon tetrachloride were refluxed under nitrogen for 6 hours. The solution was evaporated to dryness and the polymer obtained as a gum, which could be redissolved in 1,1,2-trichlorotrifluoroethane and precipitated from hexane. The polymer was filtered, washed with heptane and dried at 50° C. in a draft oven, yielding 2.6 g (52% yield) of a white powder.

Elemental Analysis: Calc'd C: 33.64; H: 2.6; N: 2.6; F: 46.16. Found: C: 33.5; H: 2.4; N: 2.6; F: 45.65.

Similarly, polymerizations could be run in dioxane or hexane. Hexane was the solvent of choice since the polymer precipitated as it was formed and could be collected in 92% yield.

Polymerizations were also conducted in hexafluoroxylene at 30% solids in an ampoule at 100° with 0.5% 1,1'-azobis(cyanocyclohexane). NMR indicated no residual vinyl monomer was present.

DSC scans of the polymer prepared in hexane were run at 10° C./min., 100 ml N$_2$/min. in open aluminum pans with a DuPont 990 Thermal Analyzer and a DSC cell base. The scans indicate a glass transition between 50° and 70° (Tg~60°), a reversible endothermic melting transition (T$_x$ (extrapolated onset temp.)—127°, T peak—140°) and an irreversible decomposition transition (t$_o$—190°, T$_x$—243°, T peak—274°).

TGA scans were run at 10°/min., 100 ml N$_2$/min., using a DuPont 951 TGA module. The scans show a 76% loss from 150°–305° and a second stepwise loss of 24% from 305°–475°. 1% wt. loss occurs at 207°, 10% at 247°, and 50% at 282°.

EXAMPLE 11

Polymer of 2-[1,1,2,2-Tetrahydroperfluorodecylthiocarbonyl-]aminoethyl methacrylate 2-[1,1,2,2-Tetrahydroperfluorodecylthiocarbonyl-]aminoethyl methacrylate (5 g), azobis-isobutyronitrile (0.006 g) and 10 ml carbon tetrachloride was refluxed under nitrogen for 6 hours. A gum precipitated and the entire preparation was evaporated to dryness, redissolved in 1,1,2-trichlorotrifluoroethane, precipitated and washed with hexane, to yield 4.3 g (86% yield) of white powder; m.p. 140°–150°.

Elemental Analysis: Cal'd C: 32.1; H: 2.2; N: 2.2; F: 50.8. Found C: 32.2; H: 2.2; N: 2.2; F: 50.6.

Similarly, polymerizations could be run in hexane and the polymer precipitated as formed and collected in 96% yield. Solvent polymerization in hexafluoroxylene could be run at 30% solids in an ampoule at 105° using 2.5% 1,1'-azobis(cyanocyclohexane) catalyst for 20 hours. NMR of the viscous solution indicated no residual monomer.

DSC scans of the polymer obtained from carbon tetrachloride were run as in Example 10. The scans indicate a glass transition at approximately 60°, which depending on thermal history may occur as high as 90°. A reversible endothermic transition ($T_x$—176°, T peak—180°) believed due to melting is followed by a large irreversible endothermic transition. ($T_o$—190°, $T_x$—228°, T peak—259°) associated with decomposition and leaving a yellow-brown residue.

TGA scans run as in Example 10 show a 0.8% loss at 115°–185° (probably solvent), 75% loss at 185°–310°, and 21% loss at 310°–500°, leaving a 3% residue.

Ignoring initial solvent loss, 1% loss occurred at 207°, 10% at 246°, and 50% at 273°.

EXAMPLE 12

Polymer of 2-[1,1,2,2-Tetrahydroperfluorodecyloxycarbonyl-]aminoethyl methacrylate 2-[1,1,2,2-Tetrahydroperfluorodecyloxycarbonyl-]aminoethyl methacrylate, Ex. 4 (5.0 g), azobisisobutyronitrile (0.006 g) and 100 ml hexane were refluxed 16 hours (polymer precipitated in 1 hour). The solution was evaporated to dryness and the white residual powder was dried in a draft oven at 50°.

Similarly, a 30% solution in hexafluoroxylene was polymerized at 100° for 16 hours using 0.6% 1,1'-azobis(cyanohexane). NMR indicated no residual vinyl monomer present.

DSC scans of the polymer were run as in Example 11. The scans indicate a glass transition at approximately 70°. An endothermic melting transition ($T_x$—173°, T peak—175°) is followed by a decomposition endotherm ($T_o$—235°, $T_x$—295°, T peak—296°).

TGA runs as in Example 10 show an 85% wt. loss at 145°–350°, 14% loss at 360°–465°, leaving a 1% residue.

EXAMPLE 13

Polymer of 2-[1,1,2,2-Tetrahydroperfluoro-octyloxycarbonyl-]aminoethyl methacrylate A 30% solution of 2-[1,1,2,2-tetrahydroperfluorooctyloxycarbonyl]aminoethyl methacrylate was polymerized at 100° for 16 hours using 0.6% 1,1'-azobis(-cyanohexane). NMR indicated no residual monomer.

EXAMPLE 14

[N-(1,1,2,2-tetrahydroperfluorodecylthioethyl)N'-(ethylene)urea]-methacrylate $C_8F_{17}CH_2CH_2SCH_2CH_2NHCONHCH_2CH_2O_2CC(CH_3)=CH_2$ 2-(1,1,2,2-tetrahydroperfluorodecylthio)ethylamine (26.15 g, 0.05 mol) and 2-isocyanatoethylmethacrylate (8.13 g, 0.0525 mol) were reacted under nitrogen in heptane (100 ml) at 45°–50° for one hour. The reaction mixture was chilled in an ice-bath, the crystallized product filtered and washed to yield 28.5 g (84% of theory) as a white solid with a melting point of 62°.

NMR showed proton resonances at δ 1.9, 3 protons C(CH$_3$)CH$_2$; δ 2.08–2.83, 6 protons C$_8$F$_{17}$CH$_2$CH$_2$SCH$_2$CH$_2$NH; δ 3.35, 2 protons, C$_8$F$_{17}$CH$_2$CH$_2$SCH$_2$CH$_2$NH; δ3.46, 2 protons NHCH$_2$CH$_2$; δ 4.18, 2 protons NHCH$_2$CH$_2$; δ 5.52, 2 protons NHCONH and 1 proton CCH$_3$CH$_2$(trans to C=O) and δ6.08, 1 proton CCH$_3$CH$_2$ (cis to C=O).

Analysis for $C_{19}H_{20}F_{17}N_2O_3S$: Calc: C, 33.6; H, 2.9; N, 4.13, F, 47.6. Found: C, 33.8; H, 2.7; N, 4.3; F, 47.4.

EXAMPLE 15

The utility of the polymers of the preceding Examples is illustrated in Table I. The materials were applied to 65/35 Polyester/Cotton at 0.10% fluorine on the treated fabric by pad application from 1,1,1-trichloroethane and tested for oil and water repellency by the methods already described.

TABLE I

| Fluoropolymers Example | Air Dried | | Oven Dried | | | |
|---|---|---|---|---|---|---|
| | Oil $A^2$ | Spray $A^2$ | at 125°/2 min. | | at 150°/5 min. | |
| | | | Oil $A^2$ | Spray $A^2$ | Oil $A^2$ | Spray $A^2$ |
| 8 (from Hexafluoroxylene) | 3–4 | 70 | 2 | 80 | 3 | 90+ |
| 9 (from Hexafluoroxylene) | 3–4 | 70− | 3 | 80 | 5 | 80+ |
| 9 (from Dioxane) | 3 | 50 | 3 | — | — | — |

EXAMPLE 16

Films of the various polymers were prepared from HFX solutions on glass plates and had the following advancing contact angles, degrees:

| Polymer | Preparative Solvent | Water | Methylene Iodide | Hexadecane |
|---|---|---|---|---|
| 9 | CCl$_4$ | 109 | 91 | 64 |
| 9 | Dioxane | 98 | 89 | 73 |
| 9 | Hexane | 112 | 88 | 68 |
| 9 | HFX | 103 | 90 | 73 |
| 8 | Dioxane | 107 | 89 | 64 |
| 8 | HFX | 103 | 87 | 68 |
| 10 | HFX | 110 | 95 | 75 |
| 11 | HFX | 102 | 92 | 71 |

EXAMPLE 17

The critical surface tension of wetting was determined by the Zisman[1] procedure using an homologous series of hydrocarbons. The films were cast from hexafluoroxylene in accord with Bernett[2] and the results are tabulated below:

| Homopolymer | $\gamma_c$ (dynes/cm) |
|---|---|
| Ex. 10 (dioxane) $C_6F_{13}CH_2CH_2SCONHCH_2CH_2OCC(CH_3)CH_2$— | 12.9 |

| Homopolymer | | $\gamma_c$ (dynes/cm) |
|---|---|---|
| $C_6F_{13}CH_2CH_2SCONHCH_2CH_2OCC(CH_3)CH_2-$ | Ex. 10 (HFX) | 13.6 |
| $C_8F_{17}CH_2CH_2SCONHCH_2CH_2OCC(CH_3)CH_2-$ | Ex. 11 (HFX) | 10.9 |
| $C_8F_{17}CH_2CH_2SCONHCH_2CH_2OCC(CH_3)CH_2-$ | Ex. 11 (CCl$_4$) | 10.4 |
| $C_8F_{17}CH_2CH_2OCONHCH_2CH_2O_2CC(CH_3)CH_2-$ | Ex. 12 (HFX) | 11.5 |
| $C_7F_{15}CH_2O_2CC(CH_3)CH_2-$ | Reported[1] | 10.6 |
| $C_8F_{17}SO_2N(C_3H_7)CH_2CH_2O_2CCHCH_2-$ | Reported[1] | 11.1 |

[1] Bernett and Zisman, J. Phys. Chem. 66, 1207 (1962).
[2] Bernett, I. E. Chem. Prod. Res. Dev. 13, (4), 250 (1974)

The following perfluoroalkyl-carbamate group containing acrylates and methacrylates and homo- and copolymers thereof can be prepared by procedures similar to those given in Examples 1-14.

| $R_f$-Precursor | Isocyanato(meth)acrylate | Comonomers (1:1 molar reactant ratio) |
|---|---|---|
| 18 $R_fCH_2CH_2CH_2SH^a$ | $O=C=NCH_2CH_2O_2CC(CH_3)=CH_2$ | methyl methacrylate |
| 19 $R_fCH_2CH_2CH_2SH^a$ | " | hydroxyethyl methacrylate |
| 20 $R_fCH_2CH_2CH_2SH^a$ | " | styrene |
| 21 | " | octyl methacrylate |
| 22 $C_8F_{17}CH_2CH_2OH$ | $O=C=NCH_2CH_2O_2CCH=CH_2$ | methyl acrylate |
| 23 $C_8F_{17}CH_2CH_2OH$ | " | hydroxyethyl acrylate |
| 24 $C_8F_{17}CH_2CH_2OH$ | " | styrene |
| 25 $C_8F_{17}CH_2CH_2OH$ | " | octyl acrylate |
| 26 $C_8F_{17}CH_2CH_2SCH_2CH_2NH_2$ | $O=C=NCH_2CH_2O_2CC(CH_3)=CH_2$ | none |
| 27 $C_6F_{13}CH_2CH_2SO_2N(Et)CH_2CH_2OH$ | " | none |
| 28 $C_7F_{15}CH_2NH_2$ | " | none |

$^a$wherein $R_f = C_6F_{13}, C_8F_{17}, C_{10}F_{21}, C_{12}F_{25}$ and $C_{14}F_{29}$

I claim:
1. A fluorinated monomer of the formula

$R_f$ is perfluoroalkyl of 3 to 12 carbom atoms,
$R_2$ is alkylene of up to 12 carbon atoms, and
$R_3$ is hydrogen or methyl.

2. A monomer according to claim 1, wherein the $R_f$ group contains from 6 to 12 carbon atoms.

3. A compound according to claim 1, wherein $R_1$ is ethylene.

4. A compound according to claim 1 wherein $R_3$ is methyl.

* * * * *